(12) United States Patent
Ahn et al.

(10) Patent No.: US 8,787,671 B2
(45) Date of Patent: Jul. 22, 2014

(54) CHARACTER RECOGNITION PREPROCESSING METHOD AND APPARATUS

(75) Inventors: Hee-Bum Ahn, Seoul (KR); Jong-Hyun Park, Jeollabuk-do (KR); Soo-Hyung Kim, Gwangju (KR); Hyung-Jung Yang, Gwangju (KR); Guee-Sang Lee, Gwangju (KR)

(73) Assignees: Samsung Electronics Co., Ltd (KR); Industry Foundation of Chonnam National University (KR)

( * ) Notice: Subject to any disclaimer, the term of this patent is extended or adjusted under 35 U.S.C. 154(b) by 782 days.

(21) Appl. No.: 13/052,851

(22) Filed: Mar. 21, 2011

(65) Prior Publication Data

US 2011/0228124 A1 Sep. 22, 2011

(30) Foreign Application Priority Data

Mar. 19, 2010 (KR) .................. 10-2010-0024849

(51) Int. Cl.
*G06K 9/34* (2006.01)
*G06K 9/32* (2006.01)

(52) U.S. Cl.
CPC .................. *G06K 9/3283* (2013.01)
USPC .................. 382/177; 382/178; 382/179

(58) Field of Classification Search
CPC .................. G06K 9/3283
USPC .................. 382/177–179
See application file for complete search history.

(56) References Cited

U.S. PATENT DOCUMENTS

| 5,781,660 | A  | * | 7/1998 | Nitta et al. ............ | 382/177 |
| 5,825,919 | A  | * | 10/1998 | Bloomberg et al. ..... | 382/177 |
| 2002/0084978 | A1 | * | 7/2002 | Araki et al. .......... | 345/156 |
| 2005/0175239 | A1 | * | 8/2005 | Araki et al. .......... | 382/177 |
| 2006/0193518 | A1 | * | 8/2006 | Dong ................ | 382/186 |
| 2006/0210195 | A1 | * | 9/2006 | Ohguro .............. | 382/290 |

FOREIGN PATENT DOCUMENTS

KR 1020060033973 4/2006

OTHER PUBLICATIONS

Su-Young Ji, "Camera Document Image Analysis Using Bezier Surface and Selected Text Region Binarization Method", Korea University, Aug. 2005.

(Continued)

*Primary Examiner* — Chan Park
*Assistant Examiner* — Mark Roz
(74) *Attorney, Agent, or Firm* — The Farrell Law Firm, P.C.

(57) ABSTRACT

Disclosed is a character recognition preprocessing method and apparatus for correcting a nonlinear character string into a linear character string. A binarized character string region is divided into character regions on a character-by-character basis. Upper and lower feature points of each character region are derived, and an upper boundary line, which is a curve connecting the upper feature points of the character regions, and a lower boundary line, which is a curve connecting the lower feature points of the character regions, are generated by applying cubic spline interpolation. Nonlinearity is corrected through adaptive region enlargement by using the maximum horizontal length and the maximum height of the divided character regions.

10 Claims, 8 Drawing Sheets
(4 of 8 Drawing Sheet(s) Filed in Color)

(56) References Cited

OTHER PUBLICATIONS

Vision Systems: "Segmentation and Pattern Recognition", I-Tech Education and Publishing, 2007.

Keechul Jung et al., "Text Information Extraction in Images and Video: A Survey", Pattern Recognition Society, 2004.

Jiang Gao et al., "Text Detection and Translation from Natural Scenes", CMU-CS-01-139, Jun. 2001.

Xilin Chen et al., "Automatic Detection and Recognition of Signs from Natural Scenes", IEEE Transactions on Image Processing, vol. 13, No. 1, Jan. 2004.

Datong Chen et al., "Text Detection and Recognition in Images and Video Frames", Pattern Recognition Society, 2004.

X. Chen et al., "Detecting and Reading Text in Natural Scenes", IEEE Computer Society Conference on Computer Vision and Pattern Recognition, 2004.

Celine Thillou et al., "An Embedded Application for Degraded Text Recognition", EURASIP Journal on Applied Signal Processing, 2005.

Nobuo Ezaki et al., "Text Detection from Natural Scene Images: Towards a System for Visually Impaired Persons", International Conference on Pattern Recognition, 2004.

Piyanuch Silapachote et al., "Automatic Sign Detection and Recognition in Natural Scenes", Proceedings of the 2005 IEEE Computer Society Conference on Computer Vision and Pattern Recognition (CVPR'05), 2005.

\* cited by examiner

CHARACTER RECOGNITION PREPROCESSING METHOD AND APPARATUS

PRIORITY

This application claims priority under 35 U.S.C. §119(a) to an application entitled "Character Recognition Preprocessing Method and Apparatus" filed in the Korean Industrial Property Office on Mar. 19, 2010 and assigned Serial No. 10-2010-0024849, the contents of which are incorporated herein by reference.

BACKGROUND OF THE INVENTION

1. Field of the Invention

The present invention relates generally to a character recognition preprocessing method and apparatus, and more particularly to a preprocessing method and apparatus for improving the accuracy of character recognition for a character string including a nonlinear distortion.

2. Description of the Related Art

In a vision-based system, various information recognizable by a human being is generally included in an image acquired from a camera. Characters are very important object information through which information can be processed and transmitted most efficiently and accurately in a vision-based system. Research on such object information has increased as applicability for character information has risen and diversity has been required for contents with the development of systems and technologies. In particular, characters included in a natural image provide a detailed representation of implicative information on a surrounding environment. Therefore, research on intelligent visual perception vision systems for character extraction, recognition, and application is being pursued in various fields.

For example, such research is underway in an intelligent visual perception robot system, a guide system for the disabled, and a conversion system between different languages for travelers. Research is also being conducted to provide diverse contents in handheld devices with a camera mounted therein, that is, mobile systems such as a cellular phone, a Personal Data Assistant (PDA), and a smart phone. Most existing technologies concern fields of character detection and extraction, binarization, and recognition, and a character recognition and conversion system for the disabled by use of a mobile system is also being studied.

In a typical natural image, a change in shade may be caused by sunlight even in regions having the same characteristic and color, and this effect results in difficulty in the understanding of a natural image. In order to solve this problem, a character region is separated from a background in an efficient manner by performing a recovery process through non-uniform illumination correction and color correction. Further, a problem of the tilting of a character region according to photographing positions of a camera is solved by linear affine conversion.

In this manner, since character information appearing in a natural image has various types of distortions, as well as various types of sizes, colors, fonts, and directions, many problems must be solved by a preprocessing procedure for character recognition.

In particular, when an image is acquired from a curved subject where characters exist, such as a label of a bottle, a distortion occurs in which the size of a character object non-linearly decreases with an increase in the distance from the center of the image. Such distortion increases algorithmic complexity in analyzing an image, and causes performance deterioration in a recognition system. Further, even with characters arranged in a flat plane, the performance deterioration may be caused in the process of character recognition when the characters are arranged in a curved form.

Further, such a distortion is highly likely to obscure information on the inherent meanings of characters and cause false recognition of the characters. Therefore, there is a need to remove the non-uniformity of nonlinear characters and correct a distortion by using the structural characteristics of neighboring characters.

SUMMARY OF THE INVENTION

Accordingly, the present invention has been made to solve the above-mentioned problems occurring in the prior art, and an aspect of the present invention provides a method and apparatus for improving the accuracy and efficiency of character recognition by correcting the distortion of nonlinear characters from a curved image, such as a label attached to a bottle.

Also, another aspect of the present invention provides a method and apparatus for simplifying a character recognition procedure by correcting the distortion of nonlinear characters from a curved image.

In accordance with an aspect of the present invention, there is provided a character recognition preprocessing method, including detecting a character string region including a character string from an image, and dividing the character string region into character regions corresponding to respective characters constituting the character string in the character string region, extracting upper feature points and lower feature points for each character region, generating an upper boundary line connecting the upper feature points and a lower boundary line connecting the lower feature points, determining a layout of a reference region; dividing a real character string region, which is formed by the upper and lower boundary lines and includes the character string, into correction character regions corresponding to the respective characters, based on the upper and lower feature points, mapping an upper boundary line of each correction character region to an upper reference straight line of the reference region by interpolation, and mapping of a lower boundary line of each correction character region to a lower reference straight line of the reference region by interpolation, and applying an interpolation value used in the mapping to respective pixels included in each correction character region, thereby mapping each character region to the reference region.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1A:
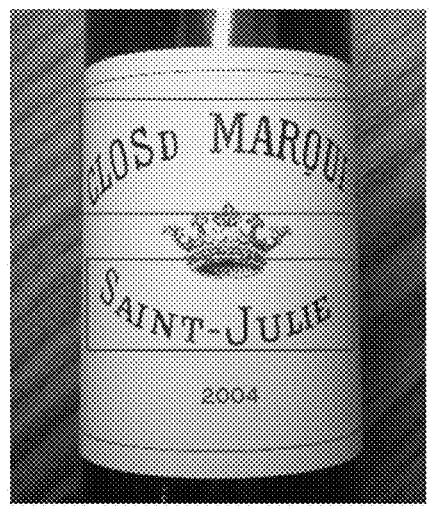
FIG. 1a to FIG. 1c illustrate an example of a character image and a corresponding character string with a nonlinear distortion.

Hereinafter, embodiments of the present invention will be described with reference to the accompanying drawings. In the following description, the same elements will be designated by the same reference numerals although they are shown in different drawings. Further, various specific definitions found in the following description, such as specific values of packet identifications, and contents of displayed information, are provided only to help general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

Preprocessing for recognizing characters included in a specific image include the steps of detecting, binarizing, and dividing a character string region. The step of binarizing a character string region is performed by various approaches based on the existing image processing techniques. However, it is difficult to recognize core characters in a label region positioned on a curved surface such as a wine bottle or accurately correct the structure of the characters by a conventional algorithm due to the position of a camera and the structural characteristics of the curved surface.

Figure 1B:
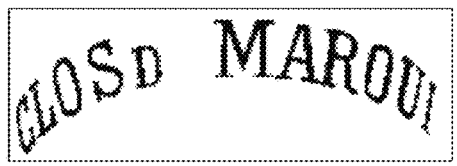
Figure 1C:
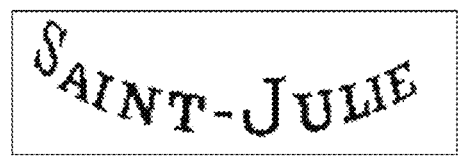

FIG. 1a illustrates a structure of characters in a label image of a wine bottle. FIG. 1b and FIG. 1c illustrate the structure of a character string extracted from the label image of FIG. 1a. It can be noted from FIG. 1b that the structure of the character string nonlinearly changes from the center area of the image toward both sides, and tilting occurs in each character. A character string with such nonlinearity is referred to as a nonlinear character string. The nonlinearity refers to a state where the arrangement of respective characters is not straight, and includes a curvature distortion occurring when a portion including a character string is a curve surface of the subject of an image, as in FIG. 1a. The state where the arrangement of respective characters is not straight is when characters are arranged, for example, in a curved or zigzag form.

Correction for a nonlinear character string is generally performed by applying linear affine conversion using a tilt and a perspective in a two-dimensional plane image. However, there are many difficulties in correcting a distortion by the conventional method due to the nonlinearity of a character string on a curved surface.

To solve this problem, the present invention discloses a method for correcting a nonlinear character string into a linear character string by enlarging or reducing and straightly arranging nonlinearly arranged characters to thus accurately and rapidly process character recognition.

A procedure of correcting a nonlinear character string into a straight form according to the present invention is as follows. After binarization for a character string region detected in an image is performed, the binarized character string region is divided into character regions on a character-by-character basis. Further, upper and the lower feature points of each character region are derived, and an upper boundary line, which is a curve connecting the upper feature points of the character regions, and a lower boundary line, which is a curve connecting the lower feature points of the character regions, are generated by applying cubic spline interpolation. Nonlinearity is corrected through adaptive region enlargement by using the maximum horizontal length and the maximum height of the divided character regions.

Accordingly, the present invention discloses a character recognition preprocessing method including detecting a character string region including a character string from an image, and dividing the character string region into character regions corresponding to respective characters constituting the character string in the character string region, extracting upper feature points and lower feature points for each character region, generating an upper boundary line connecting the upper feature points and a lower boundary line connecting the lower feature points, determining a layout of a reference region, dividing a real character string region, which is formed by the upper and lower boundary lines and includes the character string, into correction character regions corresponding to the respective characters, based on the upper and lower feature points, mapping an upper boundary line of each correction character region to an upper reference straight line of the reference region by interpolation, and mapping of a lower boundary line of each correction character region to a lower reference straight line of the reference region by interpolation, and applying an interpolation value used in the mapping to respective pixels included in each correction character region, thereby mapping each character region to the reference region.

Figure 2:
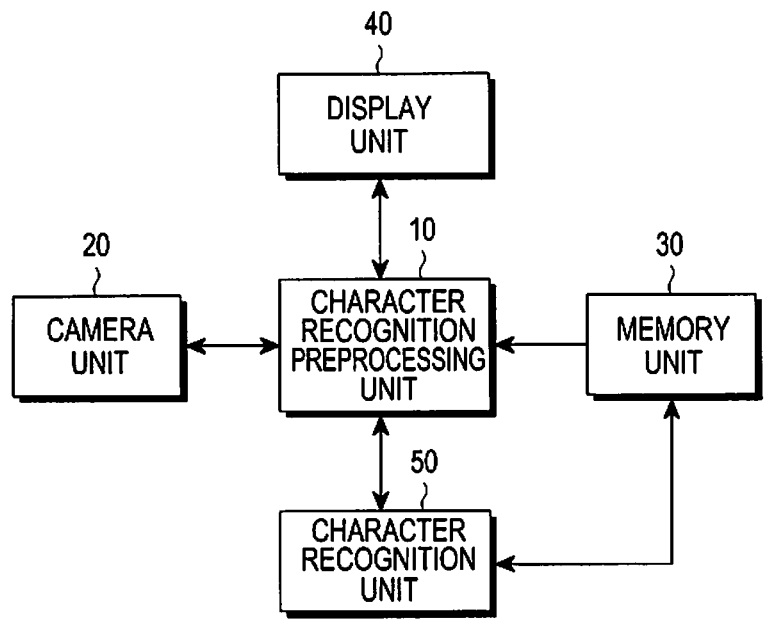
FIG. 2 illustrates a structure of a character recognition apparatus according to an embodiment of the present invention.

FIG. 2 illustrates a structure of a character recognition apparatus according to an embodiment of the present invention. Referring to FIG. 2, the character recognition apparatus includes a character recognition preprocessing unit 10, a camera module 20, a memory unit 30, a display unit 40, and a character recognition unit 50.

The display unit 40 displays data output from the character recognition preprocessing unit 10 and the character recognition unit 50 or data photographed by the camera unit 20.

The memory unit 30 stores programs for processing and controlling the character recognition preprocessing unit 10 and the character recognition unit 50, reference data, various types of updatable backup data, and provides the same to working memories of the character recognition preprocessing unit 10 and the character recognition unit 50. The memory unit 30 stores a character database required for character recognition.

The camera module 20 photographs a subject to generate an image, and outputs the generated image to the character recognition preprocessing unit 10, under the control of the character recognition preprocessing unit 10. For example, when a user takes a photograph of a wine label through the camera module 20, a wine label image is acquired, and the acquired wine label image is output to the character recognition preprocessing unit 10.

The character recognition preprocessing unit 10 extracts a character string region from a specific image input from the camera module 20, and divides the character string region into character regions on a character-by-character basis by applying a connected component analysis technique to the extracted character string region. The character recognition preprocessing unit 10 extracts four feature points including left and right end points of the upper boundary and left and right end points of the lower boundary of each divided character region, and determines a maximum height and a maximum area by comparing heights and horizontal lengths of the respective character regions. Subsequently, the character recognition preprocessing unit 10 generates boundary line regions for conversion of the character string by cubic spline interpolation, and corrects the character string by applying the disclosed adaptive nonlinearity correction algorithm.

Figure 3:
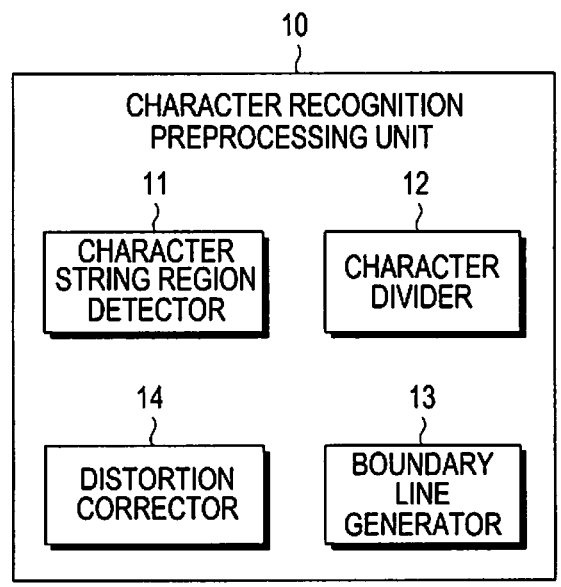
FIG. 3 illustrates a structure of a character recognition preprocessor according to an embodiment of the present invention.

FIG. 3 illustrates a structure of a character recognition preprocessing unit 10 according to an embodiment of the present invention. Referring to FIG. 3, the character recognition preprocessing unit 10 includes a character string region detector 11, a character divider 12, a boundary line generator 13, and a nonlinearity corrector 14.

Figure 4:
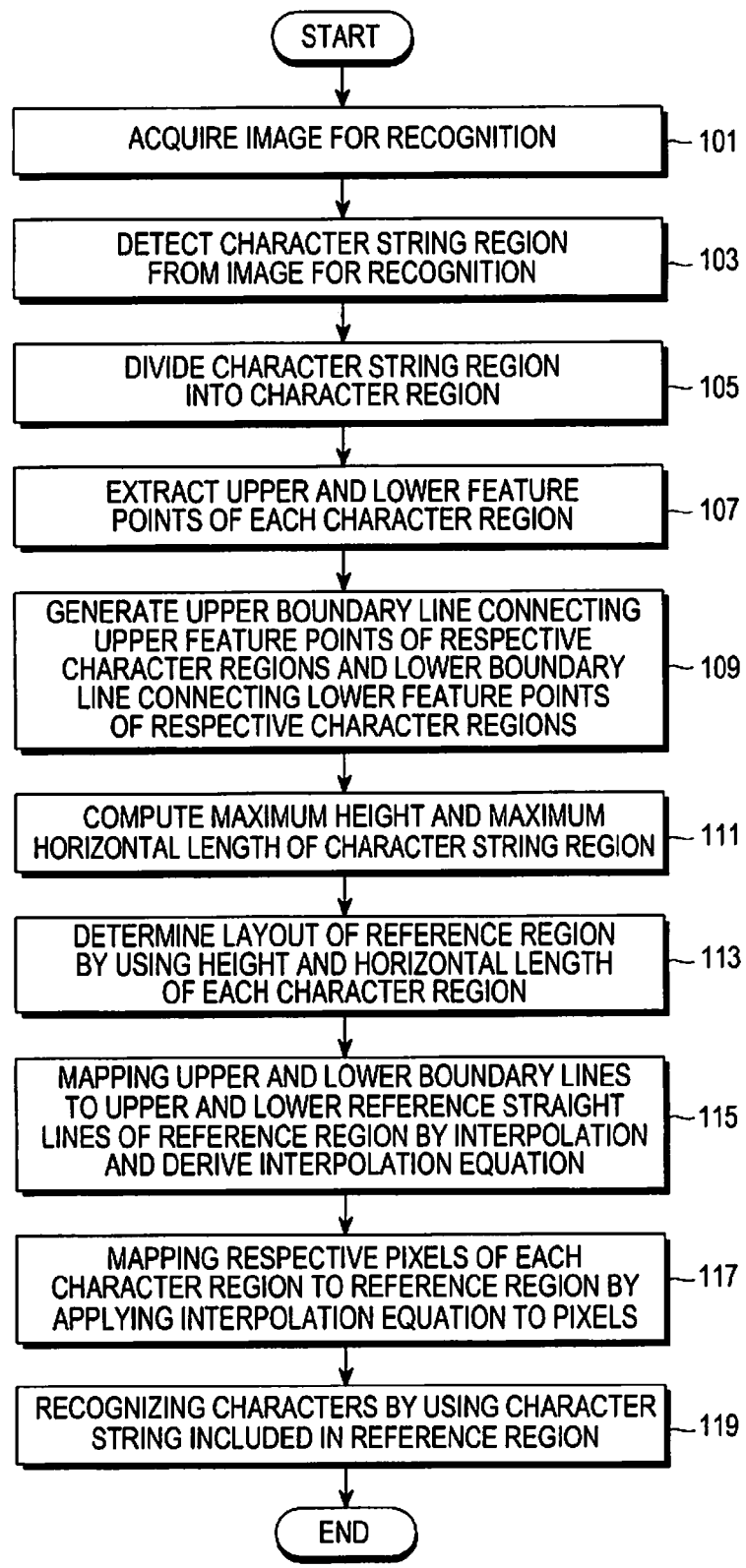
FIG. 4 illustrates an operation procedure of a character recognition apparatus according to an embodiment of the present invention.

FIG. 4 illustrates an operation procedure of a character recognition preprocessing unit 10 according to an embodiment of the present invention. Hereinafter the operation procedure of the character recognition preprocessing unit 10 according to the present invention will be described in detail with reference to FIG. 3 and FIG. 4.

Referring to FIG. 4, in step 101, the character recognition preprocessing unit 10 acquires an image for recognition through the camera module 40. The image for recognition may be, for example, an photographic image of a wine bottle as shown in FIG. 1a. In step 103, the character string region detector 11 of the character recognition preprocessing unit 10 detects a character string region from the image for recognition. For example, the character string region detector 11 may detect the character string region by wavelet-converting the image, analyzing the horizontal, vertical, and diagonal frequency conversion components, and then extracting a portion with high frequency fluctuation as the character string region from the above three frequency components. The character string region extracted in this manner is as shown in FIG. 1b. The character string region detector 11 delivers the detected character string region to the character divider 12.

Figure 6A:
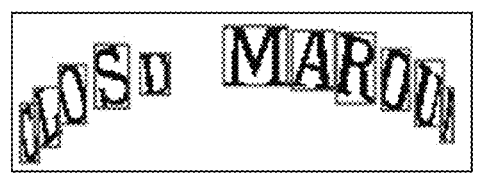
FIG. 6a illustrates a character region according to an embodiment of the present invention.

In step 105, the character divider 12 divides the character string region into character regions. Assuming that a set of continuous pixels detected in the character string region is one character object, each object may be separated as one independent character region by labeling. An example of the character regions divided in this manner is shown in FIG. 6a. As a result of dividing the character string "CLOSD MAROUI" shown in FIG. 1b into character regions, the character string may be divided into the character regions corresponding to respective letters constituting the character string, as shown in FIG. 6a.

Figure 6B:
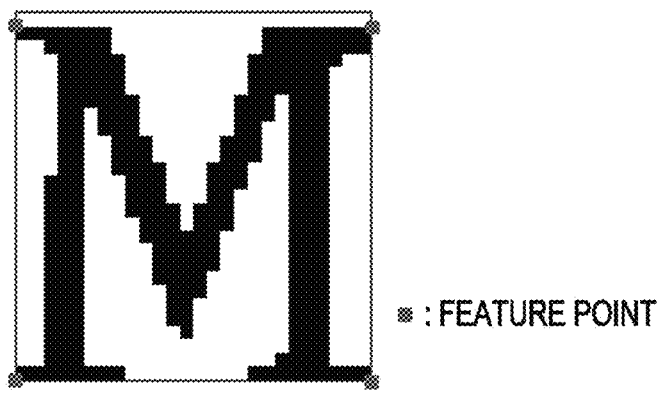
FIG. 6b illustrates feature points of a character region according to an embodiment of the present invention.

Next, in step 107, the boundary line generator 13 of the character recognition preprocessing unit 10 extracts at least one feature point for each character region. In an embodiment of the present invention, four feature points per character region are extracted. Accordingly, a total of four feature points including two upper feature points positioned at both ends of the upper boundary of each character region and two lower feature points positioned at both ends of the lower boundary of each character region are extracted. An example of these feature points is shown in FIG. 6b, which illustrates four feature points of a character region including the letter "M" of the divided character regions in FIG. 6b.

Returning to FIG. 4, in step 109, the boundary line generator 13 generates upper and lower boundary lines of the character string by using the upper and lower feature points of the respective character regions. In other words, the boundary line generator 13 generates an upper boundary line by using cubic spline interpolation to thereby generate a curve connecting the upper feature points of the respective character regions in a horizontal direction, and generates a lower boundary line by using cubic spline interpolation to thereby generate a curve connecting the lower feature points of the respective character regions in a horizontal direction. The upper and lower boundary lines form the actual outline of the character string, and the region included between the upper and lower boundary lines corresponds to a region to be converted in the process of correction. Such a region including the character string and formed by the upper and lower boundary lines is referred to as a real character region.

Figure 7A:
FIG. 7a and FIG. 7b illustrate boundary lines of a character string according to an embodiment of the present invention.
Figure 7B:
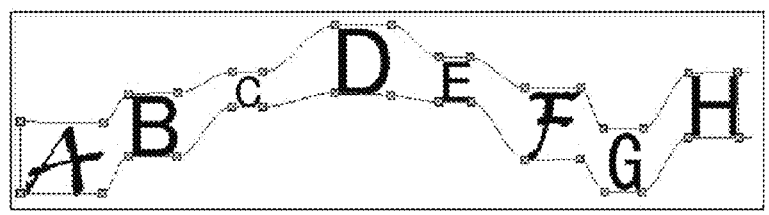

FIG. 7a illustrates an example of a nonlinear character string, and particularly shows a character string region including a character string in which the letters A, B, C, D, E, F, G, and H are arranged in a wave form. FIG. 7b illustrates the upper and lower boundary lines of the character string of FIG. 7a, which are generated by connecting upper and lower feature points of respective character regions included in the character string region respectively.

If the generation of the boundary lines of the character string is completed in this manner, the nonlinearity correction unit 14 of the character recognition preprocessing unit 10 computes the maximum height and the maximum horizontal length of the character string region in step 111. In step 113, the nonlinearity correction unit 14 determines the layout of a reference region by using the horizontal length and the height of each character region. The reference region, on the basis of which adaptive region enlargement for correcting a nonlinear character string into a linearly normalized shape is performed, is a rectangular region for interpolation mapping of pixels in each correction character region. The horizontal and vertical lengths of the reference region are preferably determined in consideration of the maximum height and the maximum horizontal length of each character region.

If the layout of the reference region is determined, the nonlinearity corrector 14 corrects each character in the real character string region in steps 115 and 117. That is, the nonlinearity corrector 14 divides the real character region into correction character regions, based on the feature points of each character. The correction character region is similar to the character region, but is different from the character region in that the upper and lower boundaries of the correction character region form a part of the upper and lower boundary lines, generated in step 109, respectively. An example of the correction character region and the reference region is shown in FIG. 8.

Figure 8:
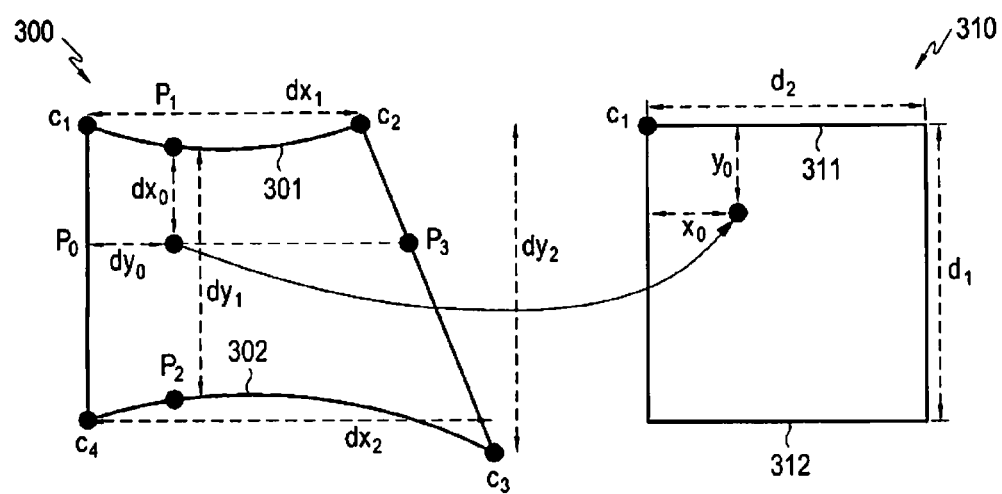
FIG. 8 explains a distortion correction procedure according to an embodiment of the present invention.

In FIG. 8, the correction character region 301 includes feature points c1, c2, c3, and c4, a first upper boundary line 301 connecting the feature points c1 and c2, and a first lower boundary line 302 connecting the feature points c3 and c4. Further, the reference region 311 is a rectangular region with a horizontal length of d2 and a vertical length of d1, the upper side of which forms an upper reference straight line 311 and the lower side of which forms a lower reference straight line 312.

The nonlinearity corrector 14 maps the correction character region to the reference region in the manner of adaptive region enlargement. That is, the nonlinearity corrector 14 maps the first upper boundary line 301 and the first lower boundary line 302 of the correction character region 300 to the upper reference straight line 311 and the lower reference straight line 312 of the layout of the reference region 310 by interpolation, respectively. In this process, a curve formula for the first upper boundary line 301 and a curve formula for the first lower boundary line 302 is derived, and an interpolation equation is derived using the derived two curve formulas. Accordingly, the nonlinearity corrector 14 maps the character region to the reference region by applying the interpolation equation to each pixel within the correction character region.

In addition, the nonlinearity corrector 14 applies Red, Green, Blue (RGB) values of the correction character region 300 to corresponding pixels of the reference region 310.

Figure 9:
FIG. 9 to FIG. 10d illustrate a result of distortion correction according to an embodiment of the present invention.
Figure 10A:
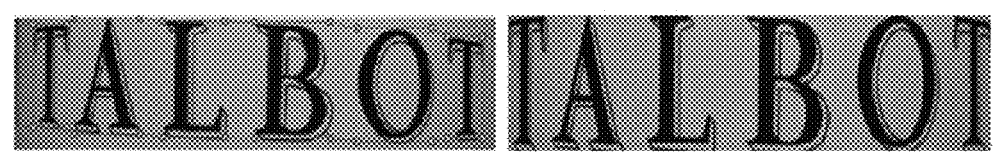
Figure 10B:
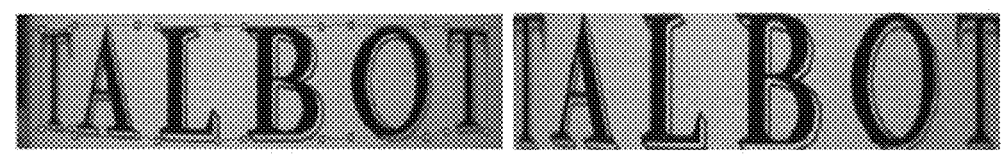
Figure 10C:
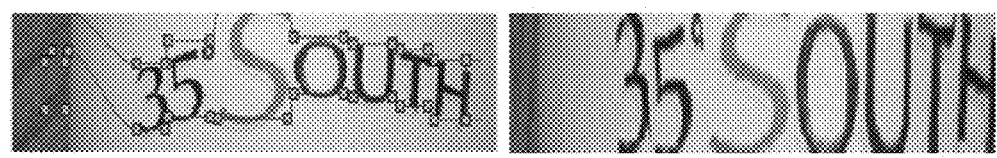
Figure 10D:
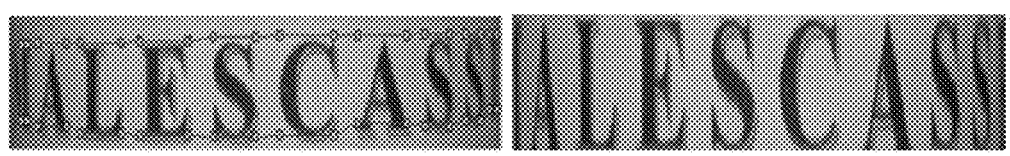

A result of correcting the real character string region of FIG. 7b in this manner is shown in FIG. 9, in which it is confirmed that the characters are arranged in a straight form while small characters are enlarged. FIG. 10a to FIG. 10d illustrate several examples of character strings corrected according to the present invention.

Figure 5:
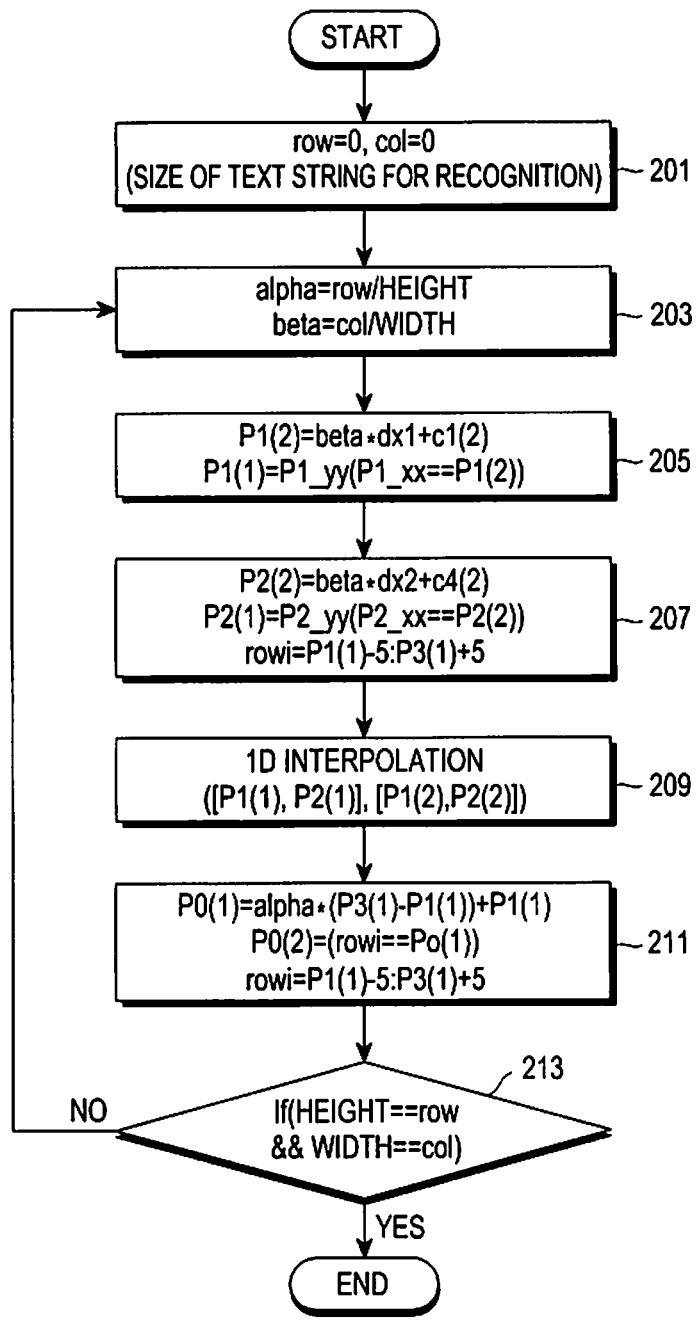
FIG. 5 illustrates a procedure of determining the coordinates of each pixel in a character region according to an embodiment of the present invention.

For the above-mentioned interpolation mapping, it is necessary to find out the coordinates of each pixel included in a correction character region. To do so, FIG. 5 illustrates a procedure of determining the coordinates of a pixel in a correction character region. The coordinates of the feature points c1, c2, c3, and c4 have been already detected in FIG. 8. In step 201 of FIG. 5, the nonlinearity corrector 14 determines the size of a text for correction by using the overall height HEIGHT and the overall length WIDTH of a character string region of interest. Here, "row" denotes a horizontal variable with respect to a maximum length, and "col" denotes a vertical variable with respect to a maximum height. That is, "row" and "col" denote any horizontal row and any vertical column of the character string region respectively. Further, "row" may have a value ranging from 0 to HEIGHT, and "col" may have a value ranging from 0 to WIDTH. In step 203, the nonlinearity corrector 14 computes values alpha and beta that are constants according to a change in the size of a character during the correction. The value alpha is computed by a ratio of "row" to WIDTH, and the value beta is computed by a ratio of "col" to HEIGHT. The values alpha and beta may vary according to characters.

Subsequently, in step 205, the nonlinearity corrector 14 computes the x coordinate $P1(2)$ of a pixel P1 existing on the first upper boundary line 301, and computes the y coordinate $P1(1)$ of the pixel P1 by substituting the computed $P1(2)$ into the curve equation (P1_yy) of the upper boundary line. There are many methods for computing the x coordinate of the pixel P1, but $P1(2)$ is computed using the following Equation (1):

$$P1(2) = \text{beta} \times dx1 + c1(2) \quad (1)$$

In Equation (1), dx1 is a distance from the feature point c1 to the feature point c2, and $c1(2)$ is the x coordinate of the feature point c1.

In this manner, the coordinates of pixels on the first upper boundary line 301 are derived.

In the same manner, in step 207, the nonlinearity corrector 14 computes the x coordinate $P2(2)$ of a pixel P2 existing on the first lower boundary line 302, and computes the y coordinate $P2(1)$ of the pixel P2 by substituting the computed $P2(2)$ into the curve equation of the lower boundary line. There are also many methods for computing the x coordinate of the pixel P2, but $P2(2)$ is computed using the following Equation (2):

$$P2(2) = \text{beta} \times dx2 + c4(2) \quad (2)$$

In Equation (2), dx2 is a distance from the feature point c4 to the feature point c3, and $c4(2)$ is the x coordinate of the feature point c4.

In this manner, the coordinates of pixels on the first upper boundary line 302 are derived.

Subsequently, in step 209, the nonlinearity corrector 14 performs one-dimensional interpolation by using the derived coordinates of the pixels P1 and P2. In step 211, the nonlinearity corrector 14 then computes the x coordinate $P0(2)$ and the y coordinate $P0(1)$ of a pixel P0 within the correction character region 300 by using the y coordinates of the pixels P1 and P2. With regard to this, the pixel P0 to be computed and the involved pixels P1 and P2 all have the same x coordinate. The x coordinate $P0(2)$ of the pixel P0 has a value rowi, and rowi can be determined by the following Equation (3):

$$rowi = P1(1) - 5 : P2(1) + 5 \quad (3)$$

In Equation (3), rowi is determined according to a ratio of a value obtained by subtracting 5 from the y coordinate of the pixel P1 and a value obtained by adding 5 to the y coordinate of the pixel P2. The constant of 5 is a value determined based on various test values.

The y coordinate $P0(1)$ of the pixel P0 can be computed by Equation (4):

$$P0(1) = \text{alpha} \times (P2(1) - P1(1)) + P1(1) \quad (4)$$

These steps are performed for the entire character region. Returning to FIG. 4, when the above correction procedure is completed, the character recognition unit 103 recognizes characters within the reference regions, which are corrected as shown in FIG. 9.

As described above, the present invention corrects the nonlinearity of nonlinear characters in an image including a curved surface, such as a label region of a wine bottle, thereby enabling accurate character recognition through a relatively simple character recognition process.

While the invention has been shown and described with reference to certain embodiments thereof, it will be understood by those skilled in the art that various changes in form and details may be made therein without departing from the spirit and scope of the invention as defined by the appended claims.

What is claimed is:

1. A character recognition preprocessing method in a character recognition preprocessing apparatus, the method comprising the steps of:

detecting a character string region including a character string from an image, and dividing the character string region into character regions corresponding to respective characters constituting the character string in the character string region;

extracting upper feature points and lower feature points for each character region;

generating an upper boundary line connecting the upper feature points and a lower boundary line connecting the lower feature points;

determining a layout of a reference region;

dividing a real character string region, which is formed by the upper and lower boundary lines and includes the character string, into correction character regions corresponding to the respective characters, based on the upper and lower feature points;

mapping an upper boundary line of each correction character region to an upper reference straight line of the reference region by interpolation, and mapping a lower boundary line of each correction character region to a lower reference straight line of the reference region by interpolation; and applying an interpolation value used in the mapping to respective pixels included in each correction character region, thereby mapping each character region to the reference region.

2. The method as claimed in claim 1, wherein the upper feature points include both end points of an upper boundary of the corresponding character region, and the lower feature points include both end points of a lower boundary of the corresponding character region.

3. The method as claimed in claim 1, wherein Red, Green, Blue (RGB) values of the pixels included in each correction character region are identical to RGB values of corresponding pixels of the reference region.

4. The method as claimed in claim 1, wherein the reference region comprises a rectangular region, and horizontal and vertical lengths of the reference region are determined using a horizontal length and a height of each character region.

5. The method as claimed in claim 1, wherein the upper and lower boundary lines are generated by cubic spline interpolation.

6. A character recognition preprocessing apparatus comprising:
   a camera for generating an image; and
   a character recognition preprocessing unit for detecting a character string region including a character string from an image, dividing the character string region into character regions corresponding to respective characters constituting the character string in the character string region, extracting upper feature points and lower feature points for each character region, generating an upper boundary line connecting the upper feature points and a lower boundary line connecting the lower feature points, determining a layout of a reference region, dividing a real character string region, which is formed by the upper and lower boundary lines and includes the character string, into correction character regions corresponding to the respective characters, based on the upper and lower feature points, mapping an upper boundary line of each correction character region to an upper reference straight line of the reference region by interpolation, mapping a lower boundary line of each correction character region to a lower reference straight line of the reference region by interpolation, and applying an interpolation value used in the mapping to respective pixels included in each correction character region, thereby mapping each character region to the reference region.

7. The apparatus as claimed in claim 6, wherein the upper feature points include both end points of an upper boundary of the corresponding character region, and the lower feature points include both end points of a lower boundary of the corresponding character region.

8. The apparatus as claimed in claim 6, wherein Red, Green, Blue (RGB) values of the pixels included in each correction character region are identical to RGB values of corresponding pixels of the reference region.

9. The apparatus as claimed in claim 6, wherein the reference region comprises a rectangular region, and horizontal and vertical lengths of the reference region are determined using a horizontal length and a height of each character region.

10. The apparatus as claimed in claim 6, wherein the upper and lower boundary lines are generated by cubic spline interpolation.

\* \* \* \* \*